(12) United States Patent
Foo et al.

(10) Patent No.: US 6,854,627 B2
(45) Date of Patent: Feb. 15, 2005

(54) VEHICULAR UTILITY RACK

(75) Inventors: Bradford Foo, San Francisco, CA (US); Jose Villarreal, South Houston, TX (US)

(73) Assignee: eRack LLC, South Houston, TX (US)

( * ) Notice: Subject to any disclaimer, the term of this patent is extended or adjusted under 35 U.S.C. 154(b) by 168 days.

(21) Appl. No.: 10/215,044

(22) Filed: Aug. 9, 2002

(65) Prior Publication Data

US 2004/0026472 A1 Feb. 12, 2004

(51) Int. Cl.⁷ .............................................. B60R 9/042
(52) U.S. Cl. ........................ 224/310; 182/127; 224/321; 224/324; 224/326; 224/553; 414/462
(58) Field of Search ................................ 224/310, 317, 224/321, 324, 325, 326, 552, 553; 280/764.1, 769; 414/462; 182/127

(56) References Cited

U.S. PATENT DOCUMENTS

| | | |
|---|---|---|
| 2,492,841 A | 12/1949 | Burkey |
| 3,141,565 A | 7/1964 | Cain |
| 3,826,390 A | 7/1974 | Watson |
| 3,862,390 A | 1/1975 | Noda |
| 3,963,136 A | 6/1976 | Spanke |
| 4,008,838 A | 2/1977 | Correll |
| 4,081,095 A | 3/1978 | Wilburn et al. |
| 4,170,331 A | 10/1979 | Faulstich |
| 4,240,571 A | 12/1980 | Ernst |
| 4,262,834 A | 4/1981 | Nutt |
| 4,291,823 A | 9/1981 | Freedman et al. |
| 4,339,223 A | 7/1982 | Golze |
| 4,350,471 A | 9/1982 | Lehmann |
| 4,390,117 A | 6/1983 | Fagan |
| 4,808,056 A | 2/1989 | Oshima |
| 4,826,387 A | 5/1989 | Audet |
| 4,887,750 A | 12/1989 | Dainty |
| 5,058,791 A | 10/1991 | Henriquez et al. |
| 5,104,280 A | 4/1992 | Ziaylek et al. |
| 5,209,628 A | 5/1993 | Hassell |
| 5,297,912 A | 3/1994 | Levi |
| 5,360,151 A | 11/1994 | Fine |
| 5,398,778 A | 3/1995 | Sexton |
| 5,421,495 A | 6/1995 | Bubik |
| 5,850,891 A | 12/1998 | Olms |
| 5,884,824 A | 3/1999 | Spring |
| 6,179,543 B1 | 1/2001 | Adame |
| 6,315,181 B1 | 11/2001 | Bradley et al. |
| 6,360,930 B1 | 3/2002 | Flickenger |
| 6,427,889 B1 * | 8/2002 | Levi ........................... 224/310 |
| 6,638,000 B2 * | 10/2003 | Groves ........................ 224/321 |

FOREIGN PATENT DOCUMENTS

EP                461709 A1 * 12/1991  ................. 224/310

* cited by examiner

Primary Examiner—Gary E. Elkins
(74) Attorney, Agent, or Firm—Foley & Lardner

(57) ABSTRACT

A vehicular utility rack apparatus having at least two frame members mounted on a vehicle to form a frame assembly. The at least two support arms are used for supporting a transported item. The two support arms also having a retainer assembly coupled to form a carriage assembly. The carriage assembly coupled to a rotational shaft for pivoting the carriage assembly. The rotational shaft coupled to an anti-friction assembly capable of reducing the amount of torque required to pivot the support arms from a position above the vehicle to a position adjacent the vehicle side.

67 Claims, 3 Drawing Sheets

VEHICULAR UTILITY RACK

BACKGROUND OF THE INVENTION

The present invention generally relates to vehicular utility racks, and more specifically to utility racks that enable a user to have a mechanical advantage during utility rack loading and unloading.

Securing and transporting large cumbersome items such as ladders, pipes, building materials, sports equipment, etc. on top of vehicles such as vans or pick-up trucks is common practice. Conventional utility racks require a user to lift the large, cumbersome item some vertical distance above the roof of the vehicle in order to secure and ready the item for transport. This process is particularly awkward when heavy, long, or particularly cumbersome items are to be loaded. Numerous prior art racks attempt to overcome the shortcomings of conventional utility racks by furnishing the user with a mechanical advantage enabling an item to be lowered from a storage position above the roof of the vehicle to a more convenient loading position adjacent the side of the vehicle.

Conventional utility racks incorporate a number of rotating, moving, and sliding parts as well as motorized and hydraulic assists making these racks more expensive to manufacture and more likely to require regular maintenance and adjustment. These complexities render these conventional rack designs impractical. Moreover, many conventional racks employ complex arrangements of various elements of the rack for various reasons. For example, U.S. Pat. No. 6,179,543 to Adame is expensive to manufacture due to the numerous mechanical parts required, and does not deliver the ladder to a low enough position adjacent the vehicle side where a user of average stature standing next to the vehicle can load or unload the ladder at shoulder height. Likewise, U.S. Pat. No. 6,315,181 to Bradley discloses a number of pivot points, rotating elements, and sliding parts all of which are expensive to manufacture and more likely to require regular maintenance and adjustment. Thus, a simplified construction is desired.

Conventional utility racks known in the art possess a number of operational limitations. Many conventional racks are not capable of delivering the item to be transported to a position adjacent the vehicle side such that a user of average stature standing next to the vehicle can easily and conveniently load or unload the item. In addition, many conventional utility racks are not capable of delivering the item to be transported to a position proximal to the vehicle side but at a distance away from the vehicle side. Such a capability avoids the possibility of damaging the vehicle during the loading and unloading of the item and further provides a more convenient and easy manner of loading and unloading the item. Furthermore, conventional utility racks failed to provide a deployment position where the item is loaded or unloaded in a level position. By providing an asymmetrical carriage assembly, conventional utility racks varied the forces operating on different portions of the rack when portions of the rack are rotated. Thus, the operation and deployment of the items were not smooth and fluid. Accordingly, a utility rack design is desired to provide not only smooth motion, but also to deploy the transported item in a level position lower to the ground and away from the vehicle.

Moreover, conventional utility racks have not been completely effective in preventing item theft while the item is in the storage position. Conventional racks are also not particularly effective in preventing large, cumbersome items from moving about while a vehicle is in motion. During transport, road vibration will cause an item not snugly secured to bounce around vertically, horizontally, and/or longitudinally. The movement of the item during transport can weaken the inherent structure of the utility rack and potentially damage the item itself, and can be objectionable due to the noise generated by the movement of the item to be transported within the utility rack.

Furthermore, conventional utility racks can hinder the opening of the hinged side door and the rear door of a utility vehicle. Many conventional racks generally deploy a carriage assembly that extends outward and pivots downward from the roof to a position substantially below the height of the roof edge and roof surface. When the carriage assembly is deployed, the cargo side door may not fully swing open requiring the user to set the item down and retract the carriage assembly before gaining entrance through the side door. Similarly, many conventional racks provide a manual lever for moving the carriage assembly from above the roof to a position adjacent the vehicle side. When the carriage assembly is in the deployed position, the position of the lever can restrict one or more of the vehicle rear doors from being swung open.

The present invention overcomes the limitations of the prior art.

SUMMARY OF THE INVENTION

The present invention provides a vehicular utility rack comprising two or more frame members mounted on a utility vehicle to form a frame assembly. Two or more parallel, transverse support arms for supporting a large, cumbersome item and an item retainer assembly coupled to the support arms to form a carriage. A simplified pivot assembly configuration for pivoting the support arms of the carriage, and an anti-friction assembly capable of reducing the amount of torque required to pivot the support arms from a storage position above the roof of a vehicle to an access position adjacent the side of the vehicle. The pivot assembly comprises an actuation lever and a rotational shaft for providing a user with a mechanical advantage to rotate the support arms of the carriage between the storage position and the deployed position. The anti-friction assembly may comprise a bearing inserted into a mountable housing. The bearing reduces the amount of torque generated during rotation of the rotational shaft thereby producing a smooth and fluid rotation completely controllable by the speed at which the actuation lever is deployed. Alternatively, the anti-friction assembly may comprise a bushing to reduce the amount of torque generated during rotation of the rotational shaft thereby producing a smooth and fluid rotation completely controllable by the speed at which the actuation lever is deployed. The actuation lever is formed to enable a user of average stature to conveniently access the lever whether it is adjacent the side of the vehicle or adjacent the rear of the vehicle. In the deployed position, the support arms extend the carriage outward, substantially parallel with the horizontal plane defined by the roof of the vehicle and substantially perpendicular to the side of the vehicle. Thus, in the deployed position the support arms suspend the item at a height where a user of average stature standing next to the vehicle will be able to comfortably load or unload the item. Moreover, in the deployed position the support arms extend outward and away from the side of the vehicle to prevent possible damage to the vehicle resulting from the loading and unloading of the item to be transported.

DETAILED DESCRIPTION OF THE INVENTION

Figure 1:
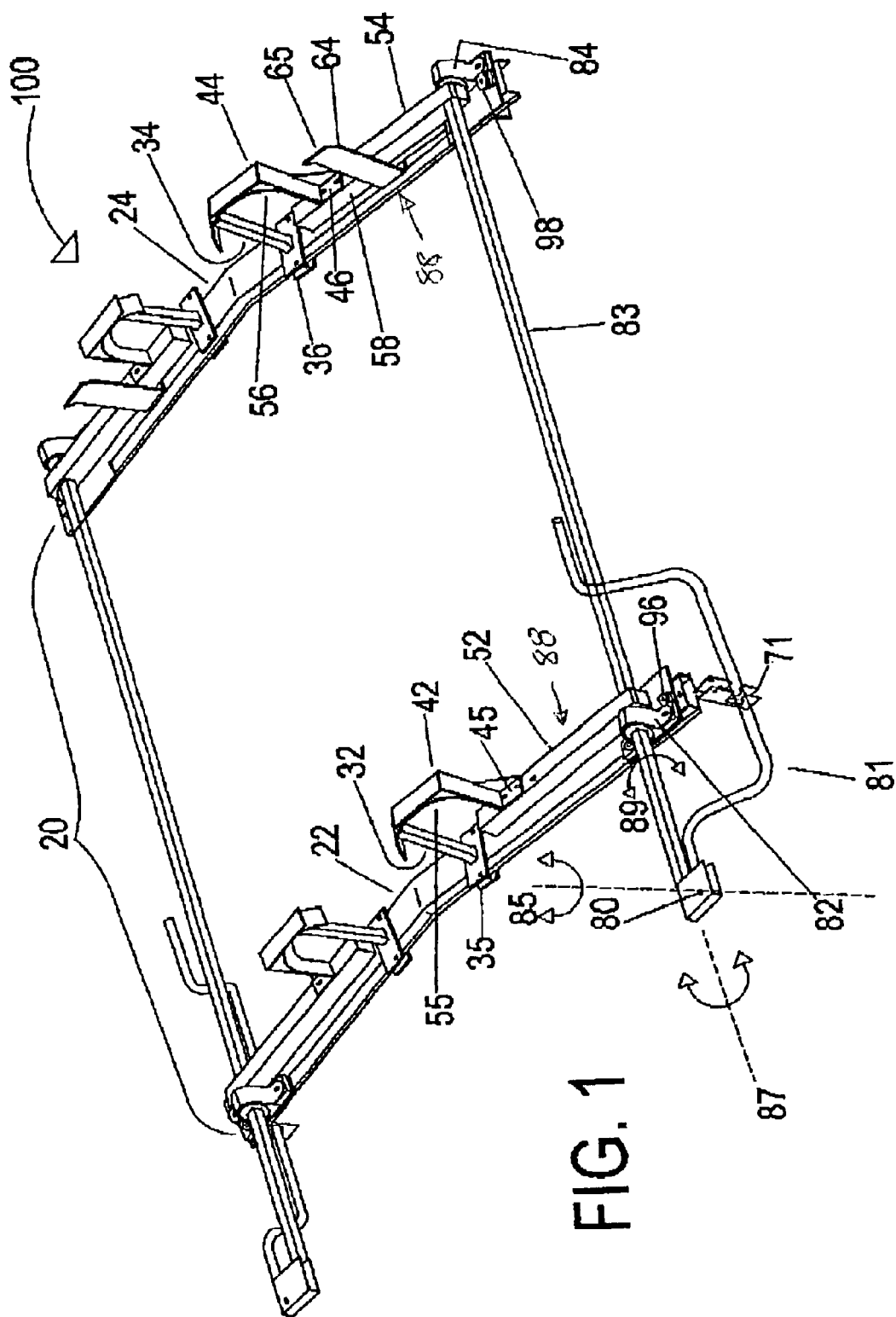
FIG. 1 is a perspective view showing a vehicular utility rack according to an embodiments of the present invention in the storage position.

FIG. 1 shows the vehicular utility rack 100 according to one embodiment of the present invention in a storage position. Frame members 22, 24 are arranged to be affixed parallel to one another on the roof of a vehicle to form a frame assembly 20. Limit members 32, 34 are affixed to frame members 22, 24 so as to engage the edge of the transported item. Limit members 32, 34 prevent inward transverse movement of the transported item when the present invention is placed in the storage position. Bottom plates 35, 36 enable limit members 32, 34 to be slideably adjusted along frame members 22, 24 accommodating items of varying widths.

Figure 2:
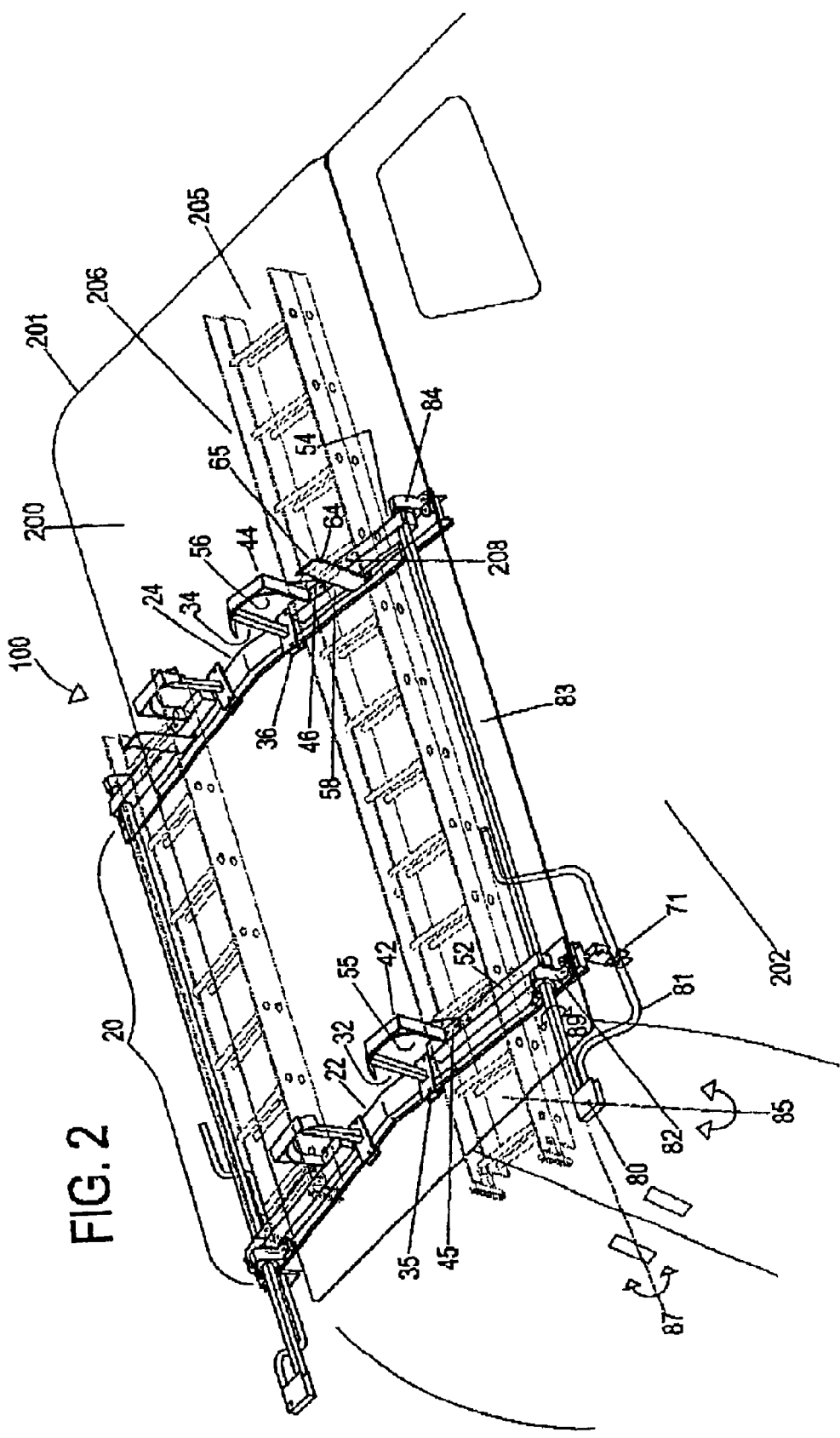
FIG. 2 is a perspective view showing a vehicular utility rack according to an embodiment of the invention securing a transported item which is a ladder in the storage position upon a motor vehicle.
Figure 3:
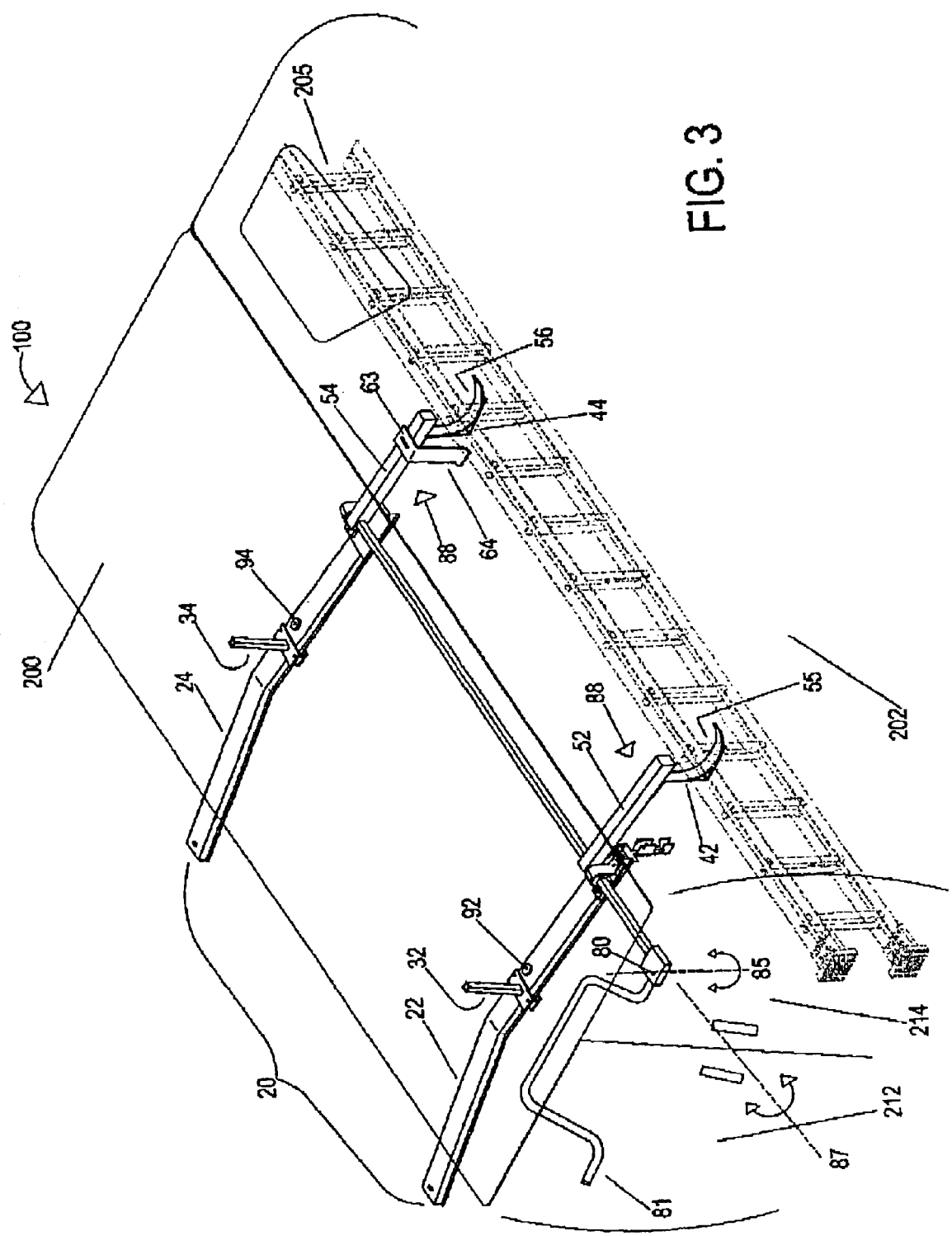
FIG. 3 is a perspective view of a vehicular utility rack according to an embodiment of the invention in its fully deployed position with a ladder shown.

The vehicular utility rack according to the present invention comprises a carriage assembly 88 to rotate a transported item between a storage position and a deployed position. Referring to FIGS. 1–3, retainer assemblies 42, 44 are comprised of bottom portions 45, 46 and arc portions 55, 56. Arc portions 55, 56 may be formed of various diameters so as to enable the retention of items of varying size and dimension. Bottom portions 45, 46 affix retainer assemblies 42, 44 to support arms 52, 54 to form a carriage assembly 88. Support arms 52, 54 may be formed of various well-known lightweight and high strength materials. Support arms 52, 54 are further formed of equal dimensions so that the rotational force required to deploy and retract the carriage assembly 88 is evenly distributed to provide smooth transitional motion. Moreover, the symmetrical configuration of the carriage assembly 88 provides delivery of the transported item in the deployed state to a level position. Support arms 52, 54 further dimensioned to provide sufficient clearance of the transported item away from adjacent side 202 of vehicle 200 when the invention is in the fully deployed state. Although retainer assemblies 42, 44 are shown in FIGS. 1–3 to be formed of bottom portions 45, 46 and arc portions 55, 56, item retainers of various configurations are well known in the art and may easily be affixed to support arms 52, 54 to transport a wide variety of items.

An anti-friction assembly comprises a bearing inserted into a mountable housing. These bearing assemblies 82, 84 reduce the amount of torque generated during rotation of the rotational shaft thereby producing a smooth and fluid rotation completely controllable by the speed at which the actuation lever is deployed. Bearing assemblies 82, 84 are mounted directly to the frame assembly 20 through frame members 22, 24. Alternatively, bearing assemblies 82, 84 may be mounted directly to the vehicle roof 201. Rotational shaft 83 is formed from any of a number of well known lightweight, high strength materials. Rotational shaft 83 is snugly inserted through bearing assemblies 82, 84. Rotational shaft 83 may be fixably inserted through or directly coupled to support arms 52, 54 such that rotational shaft 83 substantially forms an axis of rotation 87 for the carriage assembly 88. The carriage assembly 88 and rotational shaft 83 are configured such that the axis of rotation 87 of the carriage assembly 88 substantially coincides with the axis of rotation 89 through bearing assemblies 82, 84.

Actuation lever 81 is pivotably attached to one end of rotational shaft 83 at pivot point 80 so as to provide a pivot point 80 whose axis of rotation 85 is orthogonal to the axis of rotation 87 of rotational shaft 83. Actuation lever 81 is prevented from freely pivoting by way of locking mechanism 71. Locking mechanism 71 coupled to frame members 22, 24. Securing actuation lever 81 into locking mechanism 71 substantially prevents rotational shaft 83, support arms 52, 54, and the carriage assembly 88 from rotating. Locking mechanism 71 together with limit members 32, 34 and retainer assemblies 42, 44 may serve to prevent theft of the transported item. Actuation lever 81 is formed such that at least a portion of actuation lever 81 is vertically positioned lower to provide a user of average or below average stature the ability to manipulate actuation lever 81 when the utility rack is affixed to the roof of vehicle when the utility rack 100 is in the storage position. Furthermore, the shape of actuation lever 81 provides clearance for access and use of the vehicle rear doors when utility rack 100 is in the fully deployed state. Actuation levers of various configurations are known in the art and may be effectively substituted. It is also contemplated that instead of using an actuation lever to turn rotational shaft 83, the actuation lever can be replaced by a battery-operated or electrically-powered motorized gearbox.

FIGS. 2 and 3 illustrate deployment of a vehicular utility rack 100 of the present invention used to store and deploy a ladder 205. Deployment begins by releasing actuation lever 81 from locking mechanism 71. Actuation lever 81 is then pivoted about point 80 away from rotational shaft 83 until actuation lever 81 is substantially perpendicular to side 202 of vehicle 200. Actuation lever 81 is then rotated clockwise along the axis of rotation 87 which substantially coincides with axis of rotation 89 which runs through bearing assemblies 83, 84 causing a similar clockwise rotation of rotational shaft 83, support arms 52, 54 and carriage assembly 88. The rotation of the carriage assembly 88 and support arms 52, 54 causes the transported item to glide along arc portions 55, 56 of retainer assemblies 42, 44 until the transported item reaches a position parallel to and adjacent side 202 of vehicle 200 as shown in FIG. 3. Depending upon the dimensions assigned to retainer assemblies 42, 44, the transported item will be extended to a position significantly lower than the height of support arms 52, 54. In addition, when the utility rack is in the fully deployed state, the transported item is positioned approximately a distance equal to the length of support arms 52, 54 away from adjacent side 202 of vehicle 200. Thus, the transported item is delivered to a convenient position, lower to the ground, easing the loading and unloading effort required. Furthermore, the transported item is delivered to a level position sufficiently clear of the vehicle doors enabling access through the vehicle side doors. In addition, the transported item is delivered with sufficient clearance from the vehicle to prevent damage to the vehicle in the course of loading and unloading the transported item.

Bearing assemblies 82, 84 reduce the amount of torque generated during rotation of shaft 83 thereby producing a smooth and fluid rotation completely controllable by the speed at which actuation lever 81 is deployed. The clockwise rotation of actuation lever 81 and support arms 52, 54 terminates when support arms 52, 54 come in contact with shock pads 96, 98 (FIG. 1).

In FIG. 2, frame members 22, 24 are transversely affixed to roof 201 of vehicle 200. Limit members 32, 34 are affixed to frame members 22, 24 so as to engage inner rail 206 of ladder 205. Limit members 32, 34 prevent inward transverse movement of ladder 205 when in the storage position. Bottom plates 35, 36 enable limit members 32, 34 to be slideable along frame members 22, 24 to accommodate ladders of varying widths.

Retainer assemblies 42, 44 are comprised of bottom portions 45, 46 and arc portions 55, 56. Bottom portions 45, 46 affix retainer assemblies 42, 44 to support arms 52, 54. Arc portions 55, 56 point down toward roof 201 of vehicle 200. In the storage position as shown in FIG. 2, arc portions 55, 56 engage the inside and top surface of inner rail 206 preventing outward transverse movement and vertical movement.

In FIG. 3, stop member 64 is affixed to support arm 54. Horizontal portion 63 of stop member 64 is affixed to the underside of support arm 54. In FIG. 2, vertical portion 65 of stop member 64 protrudes upward and stands closely adjacent interior side 58 of support arm 54. In this preferred embodiment, stop member 64 and retainer assembly 44 engages ladder rung 208 on opposing sides preventing longitudinal movement of ladder 205.

In FIG. 3, shock pads 92, 94 are affixed to the interior portion of frame members 22, 24 closely adjacent limit members 32, 34. Referring back to FIG. 1, shock pads 96, 98 are affixed to the exterior portion of frame members 22, 24 closely adjacent bearing assemblies 82, 84. Shock pads 92, 94, 96, 98 all define stop points for terminating the rotation of support arms 52, 54. As shown in FIG. 3, when in the deployed position, ladder 205 is deployed at a position sufficiently lower than the height of the roof. In addition to the lower position resulting from the dimensions of retainer assemblies 42, 44, by way of retainer assemblies 42, 44 engagement with inside rail 206 of ladder 205 the outside rail of ladder 205 will be positioned at a significantly lower position than support arms 52, 54. Likewise, in the deployed position ladder 205 is positioned a distance approximately equal to the length of support arms 52, 54 away from adjacent side 202 of vehicle 200. Thus, damage to the vehicle is prevented when ladder 205 is loaded and unloaded from utility rack 100.

Moreover, as shown in FIG. 3, when in the deployed position, the shape of actuation lever 81 provides clearance and access to rear doors 212, 214 of vehicle 200. The clockwise rotation of actuation lever 81 about the axis of rotation 87 through bearing assemblies 82, 84 and support arms 52, 54 causes the lower portion of actuation lever 81 to terminate in a position above rear doors 212, 214 of vehicle 200. Thus, sufficient clearance to rear doors 212, 214 is permitted when utility rack 100 is in the deployed position.

The rotation of support arms 52, 54 causes ladder 205 to glide along arc portions 55, 56 of ladder retainer assemblies 42, 44 until ladder 205 reaches a position exactly parallel to and adjacent side 202 of vehicle 200 as shown in FIG. 3. The clockwise rotation of support arms 52, 54 terminates when support arms 52, 54 come in contact with shock pads 96, 98.

Securing actuation lever 81 into locking mechanism 71 substantially prevents shaft 83 and support arms 52, 54 from rotating. Locking mechanism 71 together with limit members 32, 34 and ladder retainer assemblies 42, 44 prevent theft of ladder 205.

As best shown in FIG. 3, when support arms 52, 54 lower ladder 205 to a position adjacent side 202 of vehicle 200, actuation lever 81 is situated slightly above rear doors 212, 214 of vehicle 200 enabling rear doors 212, 214 to swing open without impediment. Ladder 205 is vertically suspended from ladder retainer assemblies 42, 44 providing plentiful space for loading and unloading ladder 205. The suspended position of ladder 205 is slightly above shoulder height enabling a user of average stature to comfortably load ladder 205 onto ladder retainer assemblies 42, 44 or detach ladder 205 from ladder retainer assemblies 42, 44.

The present invention has been described with reference to use with a utility vehicle such as a van, but the apparatus is readily adaptable to mounting on a wide variety of other vehicles including minivans, sport utility vehicles, cars, pickup trucks, and trailers. The invention can also be easily retrofitted to the mounting frames of most existing utility racks. Moreover, the dimensions of the frame assembly 20 and carriage assembly 88 are well known to be adjustable to accommodate a wide variety of items for transport as well as a wide variety of vehicles upon which the utility rack may be mounted. Furthermore, as described above, various retainer assemblies may be utilized to accommodate a variety of items for transport.

What is claimed is:

1. A vehicular utility rack apparatus for transporting a variety of items, said apparatus comprising:
   a symmetrical carriage assembly which comprises at least two support arms and retainer assemblies coupled to each of said at least two support arms, wherein said at least two support arms are each a single, horizontal member;
   anti-friction assembly;
   a rotational shaft passing through an axis of rotation of said anti-friction assembly and coupled to one end of each of said at least two support arms, wherein the axis of rotation of the anti-friction assembly substantially coincides with an axis of rotation of the carriage assembly; and
   an actuation lever pivotably coupled to an end of said rotational shaft.

2. The vehicular utility rack apparatus of claim 1, further comprising at least two frame members forming a frame assembly.

3. The vehicular utility rack apparatus of claim 2, wherein said anti-friction assembly is mounted directly to each of said at least two frame members.

4. The vehicular utility rack apparatus of claim 1, wherein each of said support arms is of equal dimension.

5. The vehicular utility rack apparatus of claim 4, wherein said retainer assemblies coupled to said support arms comprises both a flat bottom portion and an arc portion.

6. The vehicular utility rack apparatus of claim 5, wherein said arc portion is composed of a friction resistant material enabling said transported item to glide along a surface of said arc portion.

7. The vehicular utility rack apparatus of claim 6, further wherein said arc portion is dimensioned to retain items of varying size and to vary a vertical position of the transported item in a deployed state.

8. The vehicular utility rack apparatus of claim 1, wherein said anti-friction assembly comprises a mountable bearing assembly.

9. The vehicular utility rack apparatus of claim 1, wherein said support arms are dimensioned to support the transported item a predetermined distance away from an adjacent side of the motor vehicle when in a deployed position.

10. The vehicular utility rack apparatus of claim 2, wherein an adjustable limit member is affixed to each of said at least two frame members.

11. The vehicular utility rack apparatus of claim 1, wherein a stop member is affixed to one of said at least two support arms.

12. The vehicular utility rack apparatus of claim 2, wherein a plurality of shock pads affixed to each of said at least two frame members define stop points of said symmetrical carriage assembly.

13. The vehicular utility rack apparatus of claim 1, wherein said actuation lever is coupled to an end of said rotational shaft at a second pivot point and shaped to enable a user to engage a lower portion of said actuation lever when in a storage position.

14. The vehicular utility rack apparatus of claim 1, wherein said actuation lever is a gearbox which causes said rotational shaft and said symmetrical carriage assembly to rotate.

15. The vehicular utility rack apparatus of claim 14, wherein said gearbox is motorized.

16. The vehicular utility rack apparatus of claim 15, further wherein said gearbox is electrically powered.

17. The vehicular utility rack apparatus of claim 15, further wherein said gearbox is battery-operated.

18. A vehicular utility rack apparatus for transporting a variety of items, said apparatus comprising:
   at least two frame members comprising a frame assembly;
   a symmetrical carriage assembly which comprises at least two support arms and retainer assemblies coupled to each of said at least two support arms, wherein each of said support arms are each a single, horizontal member of equal dimension and dimensioned to support the transported item a predetermined distance away an adjacent side of the motor vehicle when in a deployed position;
   said carriage assembly further comprising retainer assemblies which comprise both a flat bottom portion and an arc portion, and wherein said arc portion is dimensioned to retain items of varying size and to vary a vertical position of the transported item in a deployed state and is composed of a friction resistant material enabling said transported item to glide along a surface of said arc portion;
   mountable bearing assembly coupled directly to said frame assembly;
   an adjustable limit member is affixed to each of said at least two frame members;
   a stop member is affixed to one of said at least two support arms;
   a plurality of shock pads affixed to each of said at least two frame members define stop points of said carriage assembly;
   a rotational shaft passing through an axis of rotation of said mountable bearing assembly and coupled to one end of each of said at least two support arms, wherein the axis of rotation of the mountable bearing assembly substantially coincides with an axis of rotation of the carriage assembly; and
   an actuation lever pivotably coupled to an end of said rotational shaft, wherein said actuation lever coupled to an end of said rotational shaft at a second pivot point and shaped to enable a user to engage a lower portion of said actuation lever when in a storage position.

19. A vehicular utility rack apparatus for transporting a variety of items, said apparatus comprising:
   a symmetrical carriage assembly which comprises at least two support arms and means for retaining an item coupled to each of said at least two support arms, wherein said at least two support arms are each a single, horizontal member;
   means for reducing the friction associated with rotating said symmetrical carriage assembly;
   a rotational shaft passing through an axis of rotation of said means for reducing the friction and coupled to one end of each of said at least two support arms, wherein the axis of rotation of the means for reducing the friction substantially coincides with an axis of rotation of the carriage assembly; and
   an actuation lever pivotably coupled to an end of said rotational shaft.

20. The vehicular utility rack apparatus of claim 19, further comprising at least two frame members forming a frame assembly.

21. The vehicular utility rack apparatus of claim 20, wherein said anti-friction assembly is mounted directly to each of said at least two frame members.

22. The vehicular utility rack apparatus of claim 19, wherein each of said support arms is of equal dimension.

23. The vehicular utility rack apparatus of claim 22, wherein said retainer assemblies coupled to said support arms comprises both a flat bottom portion and an arc portion.

24. The vehicular utility rack apparatus of claim 23, wherein said arc portion is composed of a friction resistant material enabling said transported item to glide along a surface of said arc portion.

25. The vehicular utility rack apparatus of claim 24, further wherein said arc portion is dimensioned to retain items of varying size and to vary a vertical position of the transported item in a deployed state.

26. The vehicular utility rack apparatus of claim 19, wherein said anti-friction assembly comprises a mountable bearing assembly.

27. The vehicular utility rack apparatus of claim 19, wherein said support arms are dimensioned to support the transported item a predetermined distance away from an adjacent side of the motor vehicle when in a deployed position.

28. The vehicular utility rack apparatus of claim 20, wherein an adjustable limit member is affixed to each of said at least two frame members.

29. The vehicular utility rack apparatus of claim 19, wherein a stop member is affixed to one of said at least two support arms.

30. The vehicular utility rack apparatus of claim 20, wherein a plurality of shock pads affixed to each of said at least two frame members define stop points of said symmetrical carriage assembly.

31. The vehicular utility rack apparatus of claim 19, wherein said actuation lever is coupled to an end of said rotational shaft at a second pivot point and shaped to enable a user to engage a lower portion of said actuation lever when in a storage position.

32. The vehicular utility rack apparatus of claim 19, wherein said actuation lever is a gearbox which causes said rotational shaft and said symmetrical carriage assembly to rotate.

33. The vehicular utility rack apparatus of claim 32, wherein said gearbox is motorized.

34. The vehicular utility rack apparatus of claim 33, further wherein said gearbox is electrically powered.

35. The vehicular utility rack apparatus of claim 33, further wherein said gearbox is battery-operated.

36. A vehicular utility rack apparatus for transporting a variety of items, said apparatus comprising:
   a frame assembly, wherein said frame assembly is made up of at least two frame members;
   an adjustable limit member affixed to each of said at least two frame members a symmetrical carriage assembly which comprises at least two support arms and retainer assemblies coupled to each of said at least two support arms;

anti-friction assembly;

a rotational shaft passing through an axis of rotation of said anti-friction assembly and coupled to one end of each of said at least two support arms, wherein the axis of rotation of the anti-friction assembly substantially coincides with an axis of rotation of the carriage assembly; and an actuation lever pivotably coupled to an end of said rotational shaft.

37. The vehicular rack apparatus of claim 36, wherein said at least two support arms are each a single, horizontal member.

38. The vehicular utility rack apparatus of claim 36, wherein said anti-friction assembly is mounted directly to each of said at least two frame members.

39. The vehicular utility rack apparatus of claim 37, wherein each of said support arms is of equal dimension.

40. The vehicular utility rack apparatus of claim 36, wherein said retainer assemblies coupled to said support arms comprises both a flat bottom portion and an arc portion.

41. The vehicular utility rack apparatus of claim 40, wherein said arc portion is composed of a friction resistant material enabling said transported item to glide along a surface of said arc portion.

42. The vehicular utility rack apparatus of claim 41, further wherein said arc portion is dimensioned to retain items of varying size and to vary a vertical position of the transported item in a deployed state.

43. The vehicular utility rack apparatus of claim 36, wherein said anti-friction assembly comprises a mountable bearing assembly.

44. The vehicular utility rack apparatus of claim 36, wherein said support arms are dimensioned to support the transported item a predetermined distance away from an adjacent side of the motor vehicle when in a deployed position.

45. The vehicular utility rack apparatus of claim 36, wherein a stop member is affixed to one of said at least two support arms.

46. The vehicular utility rack apparatus of claim 36, wherein a plurality of shock pads affixed to each of said at least two frame members define stop points of said symmetrical carriage assembly.

47. The vehicular utility rack apparatus of claim 36, wherein said actuation lever is coupled to an end of said rotational shaft at a second pivot point and shaped to enable a user to engage a lower portion of said actuation lever when in a storage position.

48. The vehicular utility rack apparatus of claim 36, wherein said actuation lever is a gearbox which causes said rotational shaft and said symmetrical carriage assembly to rotate.

49. The vehicular utility rack apparatus of claim 48, wherein said gearbox is motorized.

50. The vehicular utility rack apparatus of claim 49, further wherein said gearbox is electrically powered.

51. The vehicular utility rack apparatus of claim 49, further wherein said gearbox is battery-operated.

52. A vehicular utility rack apparatus for transporting a variety of items, said apparatus comprising:

a frame assembly, wherein said frame assembly is made up of at least two frame members;

a symmetrical carriage assembly which comprises at least two support arms and retainer assemblies coupled to each of said at least two support arms;

a plurality of shock pads affixed to each of said at least two frame members define stop points of said symmetrical carriage assembly;

anti-friction assembly;

a rotational shaft passing through an axis of rotation of said anti-friction assembly and coupled to one end of each of said at least two support arms, wherein the axis of rotation of the anti-friction assembly substantially coincides with an axis of rotation of the carriage assembly; and an actuation lever pivotably coupled to an end of said rotational shaft.

53. The vehicular rack apparatus of claim 52, wherein said at least two support arms are each a single, horizontal member.

54. The vehicular utility rack apparatus of claim 52, wherein said anti-friction assembly is mounted directly to each of said at least two members.

55. The vehicular utility rack apparatus of claim 53, wherein each of said support arms is of equal dimension.

56. The vehicular utility rack apparatus of claim 52, wherein said retainer assemblies coupled to said support arms comprises both a flat bottom portion and an arc portion.

57. The vehicular utility rack apparatus of claim 56, wherein said arc portion is composed of a friction resistant material enabling said transported item to glide along a surface of said arc portion.

58. The vehicular utility rack apparatus of claim 57, further wherein said arc portion is dimensioned to retain items of varying size and to vary a vertical position of the transported item in a deployed state.

59. The vehicular utility rack apparatus of claim 52, wherein said anti-friction assembly comprises a mountable bearing assembly.

60. The vehicular utility rack apparatus of claim 52, wherein said support arms are dimensioned to support the transported item a predetermined distance away from an adjacent side of the motor vehicle when in a deployed position.

61. The vehicular utility rack apparatus of claim 52, wherein a stop member is affixed to one of said at least two support arms.

62. The vehicular utility rack apparatus of claim 52, wherein an adjustable limit member is affixed to each of said at least two frame members.

63. The vehicular utility rack apparatus of claim 52, wherein said actuation lever is coupled to an end of said rotational shaft at a second pivot point and shaped to enable a user to engage a lower portion of said actuation lever when in a storage position.

64. The vehicular utility rack apparatus of claim 52, wherein said actuation lever is a gearbox which causes said rotational shaft and said symmetrical carriage assembly to rotate.

65. The vehicular utility rack apparatus of claim 64, wherein said gearbox is motorized.

66. The vehicular utility rack apparatus of claim 65, further wherein said gearbox is electrically powered.

67. The vehicular utility rack apparatus of claim 65, further wherein said gearbox is battery-operated.

* * * * *